Patented Aug. 23, 1932

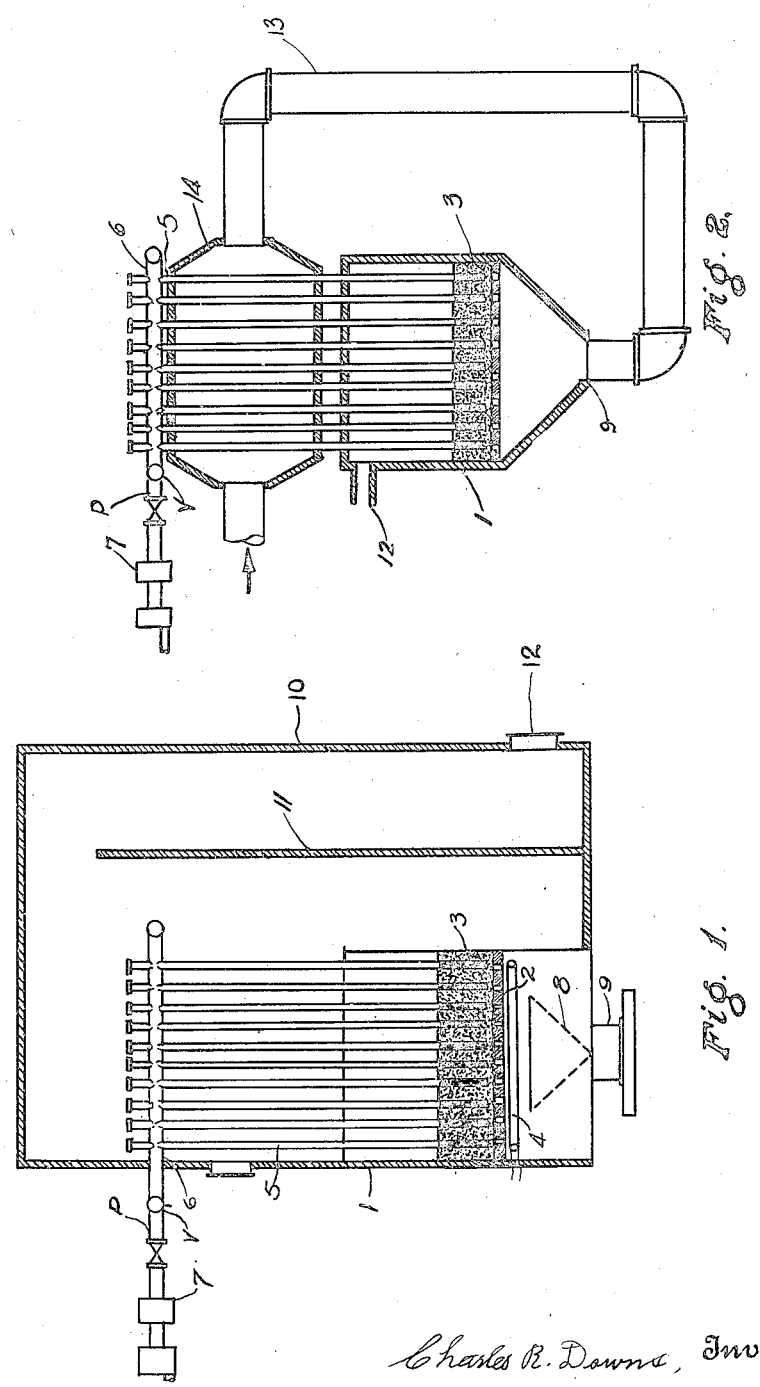

1,873,876

UNITED STATES PATENT OFFICE

CHARLES R. DOWNS, OF BRONXVILLE, NEW YORK, ASSIGNOR TO THE BARRETT COMPANY, A CORPORATION OF NEW JERSEY

APPARATUS FOR CONTROLLING TEMPERATURES IN CHEMICAL REACTIONS

Application filed February 26, 1923, Serial No. 621,144. Renewed April 19, 1929.

This invention relates to an apparatus for controlling temperatures in chemical reactions. The invention may be used to control the temperatures in chemical reactions in the liquid or vapor phase with or without a catalyzer, but is especially applicable to exothermic reactions carried on in the vapor phase in the presence of a catalyzer.

By this invention use is made of the principle that vaporizable liquids will absorb heat, which becomes latent, in changing from the liquid to the vapor state without change in temperature, the heat being carried away by the vapors from which it may be extracted, thereby condensing the vapors which may be returned for absorbing more heat.

The invention will be described and illustrated in connection with apparatus in which a gaseous reaction mixture is brought into contact with a catalyst in which or in proximity to which there are containers for a vaporizable liquid or liquids, said containers being provided with means for leading off vapors to a cooling space and returning the condensed liquid. There may be one or more containers for the liquid and they should be so shaped and disposed that heat will be readily transmitted from the catalyst to the vaporizable liquid. The present invention relates particularly to a specific construction of the generic converter structure disclosed and claimed in my copending application Serial No. 519,817, filed December 5, 1921, which has resulted in Patent No. 1,604,739 issued October 26, 1926. It is to be understood that the invention is not restricted to the particular apparatus shown, nor to the materials mentioned.

In the drawing

Fig. 1 is a section through a form of apparatus for carrying out the process, and Fig. 2 is a section through a modified form of the apparatus.

In Fig. 1 the reference character 1 refers to a container which is provided with a perforated plate 2 upon which a layer of catalyst 3 or carrier such as pumice or asbestos for said catalyst, is placed. Electrical heating means are shown at 4 and a series of pipes 5 with closed ends extend into the catalyst 3 or the carrier for the same. The upper ends of the pipes 5 terminate in a header 6 which may be connected to a pump 7 which may be used either to create a vacuum or pressure in the pipes or to introduce a gas, preferably neutral, into the header from a source, not shown. A valve V in the pipe P may be closed, if desired, after the pump 7 has been operated to obtain the desired condition in the system. The lower ends of the pipes 5 are filled with a liquid which may be vaporized and then be condensed in the upper end of the tubes 5 or in the header 6 and run back into the lower ends. A deflector 8 is shown in the lower part of the container 1 which has an inlet 9 and the container 1 is surrounded by a casing or housing 10 having a partition 11 and an outlet 12.

In the modification shown in Fig. 2, the container 1' is provided with an outlet 12', and a pipe 13 leads to the inlet 9' from the jacket 14 which surrounds the upper portion of the tubes 5'. The other parts shown in Fig. 2 are similar to the corresponding parts described in connection with Fig. 1.

The operation according to Fig. 1 is as follows: The reaction mixture is introduced through inlet 9 into container 1 where it comes into contact with the catalyst 3. If necessary, the heater 4 may first bring the temperature up to that required to initiate the catalytic reaction which is supposed to be an exothermic one. The catalyst 3 becomes heated and the heat is conducted through the walls of the tubes 5 to the liquid therein which is caused to boil and the vapors rise in the tubes 5, the upper ends of which are cooled in any convenient way so that the vapors become condensed and trickle back into the lower ends of the tubes 5. The liquid in the tubes is not heated above its boiling point because an increase in the heat transmitted to the same merely causes an increase in the ebullition without a rise in temperature. The pressure in the system may be varied by means of the pump 7 thereby varying the temperature at which the liquid will boil. After the reaction mixture has passed through the catalytic zone, the products of reaction pass upward around the wall 11 and out of the outlet 12, so that the products may be collected and used. The operation according to Fig. 2 is the same as that above described in connection with Fig. 1 except that the reaction mixture is passed through jacket 14 so as to come into contact with the tubes 5 and becomes heated before it is passed into contact with the catalyst 3'. The products of reaction pass out through outlet 12'.

A specific application of this invention is in the oxidation of naphthalene to phthalic acid in the presence of vanadium oxide as a catalyzer. It has been found that the proper temperature at which this reaction should be carried out is about 375° C. because very much higher temperatures cause the oxidation to progress too far, and the reaction will not take place satisfactorily at very much lower temperatures. Mercury boils at 357° C. so that if a mixture of an oxygen containing gas and naphthalene in the vapor phase is passed into the catalyst the exothermic reaction to produce phthalic acid will raise the temperature enough to provide sufficient temperature gradient or head between the catalyst 3 and the liquid in tubes 5 when this liquid is mercury so that the exothermic heat is transmitted from the catalyst to the mercury with sufficient rapidity to keep the temperature of the catalyst at about the proper amount, or near 375° C. The temperature will be automatically regulated to a certain extent, for when more heat is evolved the mercury will boil more rapidly and thereby remove heat more rapidly. The cooling surfaces of the pipes 5 will be made large enough to assure condensing of all the vapors, and the pressure maintained in the pipes will be such as to keep the boiling point of the liquid mercury so that it will hold the catalyst at the proper temperature. When mercury or other oxidizable liquid is used as the heat removing agency it may be advisable to introduce into the tubes 5 a neutral gas, such as nitrogen, to prevent oxidation of the liquid.

The principle of this invention may be applied in different ways without departing from the spirit and scope of the invention, and the temperature may be controlled in many other chemical reactions by using other liquids of different boiling points or the boiling points of the liquids used can be controlled within rather wide limits by changing the pressure inside the tubes 5. Two or more streams of liquids or gases, or a mixture of the same with solid materials, which react exothermically when brought into contact may have their temperatures controlled during the reaction as herein described. Further examples of chemical reaction to which this invention is applicable are the oxidation of anthracene to anthraquinone, toluene to benzoic acid and benzaldehyde, benzene to maleic acid, ethyl alcohol to acetaldehyde, and the chlorination of hydrocarbons, etc. Other applications of this invention not necessary to describe will readily occur to those skilled in the art.

This application is a division of my application Serial No. 303,337, filed June 11, 1919.

I claim:—

1. In an apparatus of the class described, two chambers, catalytic material in one of said chambers, a liquid container extending through one of said chambers and into the other, liquid in said container, and means for conveying reacting gases in succession through said chambers.

2. In an apparatus of the class described, two chambers, catalytic material in one of said chambers, a liquid container partly enclosed by both chambers, liquid in said container, and means for passing reacting gases in succession through said chambers.

3. In an apparatus of the class described, two chambers arranged one above the other, catalytic material in the lower chamber, a liquid container partly enclosed by both chambers, liquid in said container, and means for passing reacting gases through said upper chamber and then through said lower chamber.

4. In an apparatus of the class described, two chamber disposed one at a higher elevation than the other, catalytic material in said lower chamber, a liquid container comprising a substantially straight tube extending through one of said chambers into the other, liquid in said tube, and means for conveying reacting gases through said upper chamber and then through said lower chamber.

5. In an apparatus of the class described, two chambers arranged substantially vertically one above the other, catalytic material in said lower chamber, a liquid container comprising a substantially straight vertical tube partly enclosed by both chambers, liquid in said container, and means for passing reacting gases through said upper chamber and then through said lower chamber.

6. In an apparatus of the class described, two chambers, a perforated holder for catalytic material in one of said chambers, a liquid container in heat exchanging relation with said catalyst and partly enclosed by both chambers, liquid in said container, and means for passing reactive gases through one of said chambers and then through said perforated holder into the other chamber.

7. In an apparatus of the class described, a reaction chamber, a bundle of tubes having their lower portions within said chamber each closed at its lower end and each surrounded by catalytic material, liquid in said tubes adapted to be vaporized by the heat of the reaction and maintain the temperature of the reacting mixture within the desired temperature zone of reaction, and means for passing the reactive mixture in heat exchanging relation with the upper portion of said tube bundle and then in contact with the catalytic material surrounding the lower portions of said tubes.

8. In an apparatus of the class described, a chamber for the reacting mixture, a body of catalytic material in said chamber, a plurality of tubes extending into said body of catalytic material each closed at its lower end, liquid in said tubes to substantially the height of the top of said body of catalytic material and adapted to be vaporized by the heat of the reaction, means for bringing the reactive mixture into contact with said catalytic material thereby causing the generation of heat and vaporization of said liquid, means for cooling the upper portions of said tubes to condense the vapor therein, a header above said cooling means joining said tubes, and means connected with said header for varying the pressure upon the liquid within said tubes.

9. In an apparatus of the class described, a chamber for the reacting mixture, a bed of catalytic material in said chamber, a plurality of tubes extending into said body of catalytic material each closed at its lower end, said tubes each having mercury therein to substantially the height of the top of said body of catalytic material, means for bringing the reactive mixture into contact with said catalytic material thereby causing the generation of heat and vaporization of said mercury, means for cooling the upper portions of said tubes to condense the mercury vapor therein, a header above said cooling means joining said tubes, and means connected with said header for varying the pressure upon the mercury within the tubes.

10. In an apparatus of the class described, two chambers arranged one above the other, catalytic material in the lower chamber, a bundle of closely spaced tubes, each closed at its lower end, said tube bundle being partly enclosed by both chambers, liquid in said tubes, and means for passing reacting gases through said upper chamber and then through said lower chamber.

11. In an apparatus of the class described, a reaction chamber, a bundle of tubes having their lower portions within said chamber, each closed at its lower end and surrounded by catalytic material, liquid in said tubes adapted to be vaporized by the heat of the reaction and maintain the temperature of the reacting mixture within the desired temperature zone of reaction, means for bringing the reactive mixture into contact with said catalytic material, thereby causing the generation of heat and vaporization of said liquid, means for cooling the upper portions of said tubes to condense the vapor therein, a header above said cooling means joining said tubes, and means connected with said header for varying the pressure upon the liquid within said tubes.

In testimony whereof I affix my signature.

CHARLES R. DOWNS.